(12) United States Patent
Kocijan

(10) Patent No.: US 8,604,900 B2
(45) Date of Patent: Dec. 10, 2013

(54) MAGNETIC WHEEL

(75) Inventor: Franz Kocijan, Pappinbarra (AU)

(73) Assignee: Magswitch Technology Worldwide Pty Ltd, Rawdon Island (AU)

( * ) Notice: Subject to any disclaimer, the term of this patent is extended or adjusted under 35 U.S.C. 154(b) by 0 days.

(21) Appl. No.: 13/444,757

(22) Filed: Apr. 11, 2012

(65) Prior Publication Data

US 2012/0200380 A1  Aug. 9, 2012

Related U.S. Application Data

(63) Continuation of application No. 12/282,830, filed as application No. PCT/AU2007/000277 on Mar. 6, 2007, now abandoned.

(30) Foreign Application Priority Data

Mar. 13, 2006 (AU) .............................. 2006901247

(51) Int. Cl.
*H01F 21/00* (2006.01)
(52) U.S. Cl.
USPC .......................................................... 336/110
(58) Field of Classification Search
USPC .................................. 336/110, 212; 335/288
See application file for complete search history.

(56) References Cited

U.S. PATENT DOCUMENTS

| 687,931 | A | 12/1901 | Barr |
|---|---|---|---|
| 2,209,558 | A | 7/1940 | Bing et al. |
| 2,287,286 | A | 6/1942 | Bing et al. |
| 2,479,584 | A | 8/1949 | Meyer |
| 2,596,322 | A | 5/1952 | Zumwalt |
| 2,694,164 | A | 11/1954 | Geppelt |
| 2,972,485 | A | 2/1961 | Ferchland |
| 3,121,193 | A | 2/1964 | Engelsted et al. |
| 3,223,898 | A | 2/1965 | Bey |
| 3,452,310 | A | 6/1969 | Israelson |
| 3,690,393 | A | 9/1972 | Guy |
| 3,810,515 | A | 5/1974 | Ingro |
| 3,812,629 | A | 5/1974 | Campbell |
| 4,055,824 | A | 10/1977 | Baermann |

(Continued)

FOREIGN PATENT DOCUMENTS

| AU | 753496 | 10/2002 |
|---|---|---|
| CN | 1246169 | 3/2000 |

(Continued)

OTHER PUBLICATIONS

European Search Report for European Patent Application No. 06790278, mailed May 17, 2011, 2 pages.

(Continued)

*Primary Examiner* — Tuyen Nguyen
(74) *Attorney, Agent, or Firm* — Sheridan Ross P.C.

(57) ABSTRACT

Magnetic circuit that has (a) a source of magnetic flux which includes an electromagnet or one or more permanent magnets, (b) at least two oppositely polarizable pole extension bodies associated with the magnetic flux source, the bodies being disc, wheel, roller or similarly shaped with an outer circumferential surface and held rotatable about respective axes of rotation, and (c) a ferromagnetic counter body which is arranged to cooperate with the pole extension bodies such as to provide an external flux path for the magnetic flux when in magnetic proximity or contact with the circumferential surface of the pole extension bodies, which is characterized in that the magnetic flux source is held stationary relative to the rotatable pole extension bodies.

22 Claims, 6 Drawing Sheets

(56) References Cited

U.S. PATENT DOCUMENTS

| | | |
|---|---|---|
| 4,314,219 A | 2/1982 | Haraguchi |
| 4,468,648 A | 8/1984 | Uchikune |
| 4,482,034 A | 11/1984 | Baermann |
| 4,507,635 A | 3/1985 | Cardone et al. |
| 4,542,890 A | 9/1985 | Braillon |
| 4,616,796 A | 10/1986 | Inoue |
| 4,956,625 A | 9/1990 | Cardone et al. |
| 5,266,914 A | 11/1993 | Dickson et al. |
| 5,382,935 A | 1/1995 | Doyelle |
| 5,435,613 A | 7/1995 | Jung |
| 5,631,618 A | 5/1997 | Trumper et al. |
| 5,809,099 A | 9/1998 | Kim et al. |
| 5,853,655 A | 12/1998 | Baker |
| 6,076,873 A | 6/2000 | Jung |
| 6,094,119 A | 7/2000 | Reznik et al. |
| 6,104,271 A | 8/2000 | Barrett |
| 6,489,871 B1 | 12/2002 | Barton |
| 6,654,156 B1 | 11/2003 | Crossland et al. |
| 6,886,651 B1 | 5/2005 | Slocum et al. |
| 7,012,495 B2 | 3/2006 | Underwood |
| 7,161,451 B2 | 1/2007 | Shen |
| 2004/0239460 A1 | 12/2004 | Kocijan |
| 2005/0269827 A1 | 12/2005 | Heard |
| 2009/0027149 A1 | 1/2009 | Kocijan |
| 2009/0078484 A1 | 3/2009 | Kocijan |
| 2012/0092104 A1 | 4/2012 | Kocijan |

FOREIGN PATENT DOCUMENTS

| | | |
|---|---|---|
| CN | 1453161 | 11/2003 |
| DE | 1121242 | 1/1962 |
| EP | 0974545 | 11/2003 |
| JP | S55-151775 | 11/1980 |
| JP | 2000-318861 | 11/2000 |
| JP | 3816136 | 8/2006 |
| JP | 4743966 | 8/2011 |
| RU | 2055748 | 3/1996 |
| WO | WO 00/40018 | 7/2000 |
| WO | WO 2005/005049 | 1/2005 |

OTHER PUBLICATIONS

International Search Report dated Dec. 18, 2006, prepared by the Australian Patent Office for International Application No. PCT/AU2006/001407 filed Sep. 26, 2006.

International Preliminary Report on Patentability prepared by the Australian Patent office for International Application No. PCT/AU2006/001407 filed Sep. 26, 2006.

International Search Report for International (PCT) Patent Application No. PCT/AU2007/000277, mailed May 17, 2007.

Written Opinion for International (PCT) Patent Application No. PCT/AU2007/000277, mailed May 17, 2007.

International Preliminary Report on Patentability for International (PCT) Patent Application No. PCT/AU2007/000277, mailed Nov. 22, 2007.

Written Opinion for International (PCT) Patent Application No. PCT/AU2006/001407, mailed Jan. 5, 2007.

Official Action for U.S. Appl. No. 12/088,071, mailed Aug. 31, 2010 11 pages.

Official Action for U.S. Appl. No. 12/088,071, mailed Apr. 21, 2011 14 pages.

Official Action for U.S. Appl. No. 13/278340, mailed Apr. 11, 2012, 22 pages.

Official Action for U.S. Appl. No. 13/278340, mailed Sep. 11, 2012, 19 pages.

Official Action for U.S. Appl. No. 12/282,830, mailed Oct. 12, 2011 8 pages.

MAGNETIC WHEEL

CROSS REFERENCE TO RELATED APPLICATIONS

This application is a Continuation of U.S. application Ser. No. 12/282,830, filed Oct. 22, 2008, which is a National Stage application under 35 U.S.C. 371 of PCT Application No. PCT/AU2007/000277 filed on Mar. 6, 2007, which designated the United States, which PCT application claimed the benefit of Australian Application No. 2006901247 filed Mar. 13, 2006, the entire disclosure of each of which are hereby incorporated herein by reference for all purposes.

FIELD OF THE INVENTION

The present invention relates to the field of magnetics, in particular to the use of magnetic force to attach one object to another whilst allowing movement of the objects relative to one another in a magnetically attached state.

BACKGROUND OF THE INVENTION

There are numerous situations and applications where it is desirable and/or necessary to secure or support one object to or on another object whilst allowing for freedom of translational or rotational movement of these objects relative to one another.

In the field of material handling, for example, roller conveyors are used to transport sheet metal and other ferromagnetic work pieces from one location to another. Gravity forces are relied upon to ensure the work pieces remain on the conveyor rollers (some of which may be driven and others being idle rollers) as these are transported, and thus such conveyor systems will mostly have roller transport paths extending substantially in a common horizontal plane, unless additional, dedicated hold-down structures are employed in restraining the work pieces from lifting-off from where rollers are deployed along inclined travel path sections.

In overhead conveying applications in enclosed surroundings, eg large warehouses, it is known to install overhead rails to which are secured wheeled carriages from which in turn may be suspended crane head structures, grippers and similar attachment devices. Gravity force is relied upon to hold the grooved carriage wheels in engagement with and on top of the overhead guide rails, and side brackets provide additional security against lateral dislodgement from the rails.

In the field of high-rise building construction, it is known to provide vertically extending rails which provide guidance for working platforms which are suspended for vertical movement from the top of the building in order to carry out maintenance work, such as window cleaning, etc. The platforms incorporate gripper mechanisms which form-fittingly engage over the rails to restrain horizontal movement (eg swaying) whilst held vertically movable along the rail.

In the field of robotics, in particular such using remote controlled vehicles, it is known to incorporate into autonomous, wheeled platform or self-tracked vehicles, a multitude of different type of tools and implements by way of which specific tasks may be carried out remotely by an operator. For example, gripper-arms can be deployed from such vehicles to recover samples in difficult to access or hostile environments. Whilst friction enhancing wheel and track coatings may be used to increase adherence of the vehicle to the surface in order to allow the vehicle to climb or descend along steep inclines, there are limits to the steepness of the travel path which such vehicle may safely master without tipping over or sliding in uncontrolled manner.

The present invention was conceived having regard to applications such as those listed above, and in particular to one or more application environments where (a) ferromagnetic materials require conveying or transporting, (b) the incorporation of or presence of ferromagnetic structures would allow the use of magnets as a source of force to secure objects to one another in displaceable manner, (c) gravitational forces are absent to provide for force-locking engagement of a movable object onto a dedicated ferromagnetic material substrate or support surface, or (d) indeed the presence of gravitational forces would necessitate the erection of or provision of specialised support, guide or other retention structures or measures to enable a vehicle, either self-propelled or otherwise, to move along steeply inclined, vertical, and even inclined or horizontal overhanging (eg ceiling) surfaces having ferromagnetic properties. However, the below disclosed invention and its underlying principles may find broader applications, also replacing existing solutions currently not employing magnetic force to achieve object coupling.

In using particular permanent magnets to secure objects to one another, it is known that the magnetic attraction force is a function of the type and amount of active magnetic material employed, the geometry of the magnet's working face, air or other magnetic leakage paths in the magnetic flux circuit encompassing the active magnetic material and the body being subjected to the magnetic attraction force, the ferromagnetic material properties of the attracted body (ie its relative permeability and magnetic saturation limits), and the orientation of the Normal force vector between attracted objects relative to the gravity force vector. The displacement force required will then be a function of the effective attraction force and the coefficient of friction defined between the surfaces of objects.

In other terms, the physical and geometrical factors, as well as the functional energetic elements of the closed (or loaded) magnetic circuit created between a first object (eg an object carrying a permanent magnet) and a second object (eg ferromagnetic sheet) will determine ultimately how strongly the objects are attracted to one another, and whether these objects can be displaced relative to one another whilst remaining attached to one another.

The stronger planar surfaces of objects are 'forced' together by a magnetic attraction force, the more difficult it is to displace them relative to one another whilst remaining attached to one another, by exerting a force perpendicular to the attracting force vector, for any given coefficient of friction which applies for the pairing of materials of the two objects. It is also recognised that magnetically attractive surfaces can have very large friction coefficients, and this knowledge has found expression in a wide range of technical solutions, such as magnetic clamps, magnetic lifters, magnetic chucks, etc, where ferromagnetic objects are to be firmly secured against displacement (assuming normal operational condition) at a supporting structure that incorporates magnetic active materials.

In seeking to enable magnetically coupled objects to move more easily relative to one another, so called magnetic wheels have been devised for selected industrial applications, eg self-propelled welding and inspection robots.

In its simplest incarnation, a magnetic wheel may be comprised of a solid disc of permanent magnetic material, eg a disc-shaped Neodymium-Iron-Boron magnet, magnetised such that opposite axial end faces of the magnet have different polarity (here termed axially magnetised). One such disc each can be secured on opposite terminal ends of a non-magnetisable axle member, which in turn can be mounted to a vehicle chassis or frame, whereby the discs may engage with their peripheral surface on a magnetically attractive substrate surface and roll on such surface in a magnetically attached state, compare for example U.S. Pat. No. 6,886,651 (Slocum et al.), column 12, lines 44 following. Each disc (or wheel) will generate an at least partially closed loop magnetic field extending into the substrate on which it rests, creating a strong attractive force between the disc and substrate.

Slocum also discloses a somewhat more elaborate yet simple magnetic wheel consisting of a disc-shaped, axially magnetised magnetic core element sandwiched between two magnetically attractive disc members (made of soft steel, permalloy or laminated structures comprising such magnetisable but otherwise magnetically passive materials) having a diameter that is somewhat larger than the magnet core so that only the disc members can come with their peripheral surfaces into contact with the magnetically attractive surface on which the wheel is to magnetically engage. The disc members thus represent pole extension pieces which concentrate the magnetic flux originating in the magnetic core element and provide a low reluctance path for such flux, thus improving the attractive force between each wheel unit and magnetically attractive support surface as compared to the wheel embodiment without pole extension discs.

Slocum's magnetic wheels are incorporated into self-propelled carriages that form part of a material transportation system wherein such carriages can travel along magnetically attractive surfaces that may include a ceiling, vertical and inclined walls.

U.S. Pat. No. 5,809,099 discloses a laser-guided underwater wall climbing robot for use in inspecting reactor pressure vessels, which robot includes a self-propelled vehicle supperstructure that incorporates four magnetic wheels used to provide the necessary attraction force to allow the vehicle to travel along the ferromagnetic inner surface of the reactor vessel. Each wheel consists of a ring-shaped permanent magnet supported on a non-magnetic axle shaft for rotation therewith, two steel discs of slightly larger diameter than the magnet being magnetically attached and secured to the opposite axial faces of the ring-magnet, ie the discs provide magnetised pole extension pieces as well as the peripheral engagement surface of the wheel unit, similar to the Slocum wheel described above.

U.S. Pat. No. 5,853,655 describes a magnetic wheel guided carriage for automated welding and cutting of ferromagnetic substrates such as pipes, steel plates, wherein the magnetic wheels consist of a plurality (eg three) of axially magnetised ring-shaped magnets sandwiched between interleaving ring-shaped mild steel discs (eg five) of a diameter that is larger than that of the magnets. The stacked discs are mounted and secured against rotation on a stainless steel sleeve which in turn will be received on an axle of the carriage. Again, each wheel unit has a plurality of N- and S-poles whose magnetic field extends into the ferromagnetic substrate thereby creating at each wheel a closed magnetic flux path securing the wheels to the substrate surface.

Other prior art patent documents are also known to deal with aspects and methodologies that seek to address specific shortcomings that 'basic' magnetic wheels may exhibit in certain application fields.

So for example, U.S. Pat. No. 3,690,393 (Guy) would seem to aim to address the above mentioned problem that magnetically attractive surfaces can have very large friction coefficients which in certain applications can be detrimental. Guy describes a vehicle having a frame on which is mounted a prime mover (eg electric motor) which is coupled by suitable gearing to a live (or traction) axle to which a pair of wheel assemblies are secured in order to propel the vehicle. In one embodiment, one of the non-driven wheel assemblies consist of a plurality of axially polarised annular magnet discs secured to one another to form a cylindrical roller wheel whose outer (peripheral) surface is coated with a thin layer of a non-polarizable, anti-friction material, such as PTFE (polytetrafluoroethylene) which minimises drag on the wheel assembly as the vehicle frame is propelled.

Guy also describes an electromagnetic wheel assembly, in which a non-magnetic cylindrical shell encloses an electromagnetic coil about an inner core element mounted on the wheel's axle for rotation therewith. Magnetisable pole discs are arranged at the axial ends of the shell member, and electrical energy can be supplied to the magnet coil through wiper contacts secured to one of the pole discs. Upon energization of the electro-magnetic coil, the pole discs will be polarised with opposite polarities. The annular rims of the pole discs are again coated with a non-magnetisable, low-friction material for rolling contact with the magnetisable substrate surface oh which the vehicle is intended to travel.

In contrast, U.S. Pat. No. 2,694,164 (Geppelt) discloses magnetic wheels of a type used in conjunction with welding and cutting torch carriages which are self-propelled over ferromagnetic surfaces. The magnetic wheel units consist of an axle sleeve of non magnetisable material received within an annular-cylindrical permanent magnet which is magnetized in its axial direction, two cylindrically cup shaped wheel members of soft steel material which have their annular flanges extending towards each other and into clamped close engagement with opposite sides of a non-magnetic spacer disc that surrounds the magnet about the middle of its axial length. The axial end faces of the magnet abut against the respectively facing inner faces of the cup wheel members such as to allow magnetic flux transfer from the magnet into the wheels towards their peripheral surface, the spacer disc serving to ensure magnetic decoupling of the two wheels whereby these will assume opposite polarities in accordance with the magnetic field generated by the permanent magnet of the wheel. Geppelt outlines that the decrease in wall thickness of the annular cup flanges towards the spacer disc (as compared to a prior art embodiment with uniform cup flange thickness) increases the attractive force that may be exerted between the magnetic wheel and the substrate to which it attaches.

In practical terms, and in light of the above description of prior art magnetic wheel constructs, a technical challenge still exists in devising methods and arrangements of magnetic flux transfer from a magnet, as a source of magnetic force to attach one object to another, through a wheel structure into a magnetically attractive body, to meet specified operational load carrying capacity or retention requirements.

In a more confined aspect, it would be desirable to provide a vehicle which uses magnetic energy to secure such vehicle onto a ferromagnetic substrate surface and in which the magnetic flux transfer mechanism will allow for greater flexibility with regards to magnetically coupling and decoupling of the vehicle from the substrate surface.

In another more confined aspect, it would be desirable to provide a magnetic support structure by means of which a ferromagnetic object may be transported between locations in a secured manner and wherein at the end of such transporting operation the object may be safely and easily disengaged from the support structure.

In another aspect, it would be desirable to provide a magnetic gripper appliance which may be actuated in order to secure an object thereto whilst allowing for freedom of movement of the object in order to conduct machining or other operations on the object.

The term 'ferromagnetic' as used herein is intended to cover not only metals and alloys but also composite materials which when subjected to an external magnetic field will become magnetised and subject to magnetisation forces.

Other aspects of the invention will become apparent below from the following description of preferred embodiments thereof.

SUMMARY OF THE INVENTION

In broad terms, the present invention can be defined as residing in a magnetic circuit that has (a) a source of magnetic flux which includes an electromagnet or one or more permanent magnets, (b) at least two oppositely polarisable pole extension bodies associated with the magnetic flux source, the bodies being disc, wheel, roller or similarly shaped with an outer circumferential surface and held rotatable about respective axes of rotation, and (c) a ferromagnetic counter body which is arranged to cooperate with the pole extension bodies such as to provide an external flux path for the magnetic flux when in magnetic proximity or contact with the circumferential surface of the pole extension bodies, which is characterised in that the magnetic flux source is held stationary relative to the rotatable pole extension bodies.

Compared with what may be termed 'traditional' magnetic wheel circuits utilised in attaching one object to another, such as those described above, the present invention physically decouples the active magnetic source or component (eg electromagnet, switchable permanent magnet, or conventional permanent magnet) from the disc-, roller- or wheel-like pole extension pieces, wherein the pole extension pieces remain free to rotate about their respective axes of rotation but the associated magnetic flux source remains stationary, ie it does not rotate with the pole extension pieces.

Preferably, physically decoupling will be accompanied by spatially separating the flux source from the rotatable pole extension pieces, eg by maintaining a small air gap between these components, see also below. The term 'small' will depend on the specific application and may for example be 0.1 mm (or smaller) up to a few millimetres.

Vis a vis the above described prior art magnetic wheels, the mass associated with the magnetic flux source is no longer subject to rotation with the wheel, thereby reducing inertia moments at the wheel structure proper, with all the concomitant advantages which such reduced wheel mass brings with it. Physical decoupling of the wheels from the magnetic flux source also enables greater flexibility in devising or designing the flux source itself.

Equally, where the source of magnetic flux of a magnetic wheel unit is an electro-magnet, such as described in U.S. Pat. No. 3,690,393 or 6,886,651, physical decoupling of the magnetic flux source from the rotatable wheels in accordance with the invention simplifies the mechanism/arrangement required for transferring electrical power into the magnet coil, given that the later remains stationary and there is no need for brushes or pole shoes otherwise required for transferring electricity through the pole pieces (or otherwise) into the rotating electro-magnet coil armature.

Independently of the type of magnetic flux source utilised, magnetic flux transfer from the source into the rotatable pole extension members will be effected across a 'working gap' that can be air or could conceivably be a different fluid confined into the volume present between flux source unit and pole wheels, the fluid then preferentially providing a low magnetic reluctance path, ie a magnetisable fluid that has a relative magnetic reluctance that is less than air.

It will also be noted that in contrast with prior art magnetic wheels, each of which comprises at least one N-S pole pair, the invention can provide embodiments and arrangements wherein each rotatable pole extension member assumes only one polarity, ie either S- or N-polarity, so that the closed magnetic flux path will encompass flux transfer from one pole extension member through the ferromagnetic counter body, which provides a low reluctance magnetic flux path, and into the other pole extension member. In other words, two such rotatable pole extension members are necessary and sufficient for a closed flux transfer circuit.

In the following, for ease of understanding, and unless it appears differently in the specific context, the term 'wheel' will be used to encompass all types of rotatable pole extension bodies such as unitary soft-steel discs, cylindrical rollers, pulleys and other structures that generally comprise a rim and hub united by a radial connection structure, eg spokes, face web, etc, and which are capable of rotation about a stationary (axial) axis and which serve to support a vehicle or work piece for translational or rotational movement upon rotation of the rim.

In a more specific aspect, the present invention provides a vehicle capable of magnetically attaching to a magnetically attractive substrate, including a vehicle body at which are supported at least two wheel members and at least one dipole magnet, wherein the wheel members include magnetically passive but polarisable material, wherein the wheel members and the dipole magnet(s) are spatially located on the vehicle body in a manner wherein the wheel members provide rotatable, oppositely polarisable pole extension elements of the otherwise stationary dipole magnet(s), whereby resting of the wheel members on the surface of the substrate creates a closed magnetic circuit encompassing the dipole magnet, pole piece wheel members and substrate.

In an alternate specific aspect of the invention, there is provided a support structure capable of magnetically retaining attached to it in an otherwise translationally or rotationally displaceable manner a magnetically attractive substrate, including a support body at which are mounted at least two wheel or roller members arranged for rotation about respective axes, and at least one dipole magnet mounted at the support body separate from the wheel or roller members, wherein the wheel or roller members include magnetically passive but polarisable material, and are spatially located on the support structure in a manner wherein the wheel or roller members provide rotatable, oppositely polarisable pole extension elements of the otherwise stationary dipole magnet(s), whereby bringing a ferromagnetic substrate into surface contact with the peripheral surface of both the wheel or roller members creates a closed magnetic circuit encompassing the dipole magnet(s), pole extension wheel or roller members and substrate.

In essence, whilst the first aspect is directed at providing a vehicular implementation of the broader concept underlying the invention, eg providing externally or self-propelled vehicle embodiments capable of movement along inclined or vertical walls, for example, the second aspect is intended to cover applications where the wheels or roller members together with the support body remain stationary such as in a conveyor apparatus for conveying of ferromagnetic objects, such as steel plates, along a plurality of magnetically polarisable roller members disposed along a conveying pathway, or applications where the support body is itself carried or mounted at another appliance, eg robotic arm, thereby to allow the pole wheel members to magnetically engage against and secure thereto a ferromagnetic object or work piece.

It will also be appreciated that whilst it is feasible to employ conventional permanent magnets (ie such which always exhibit an external magnetic field) as the source of magnetisation of the pole extension wheels, the basic concept underlying the present invention is particularly conducive towards implementation of vehicular and other embodiments that utilise switchable permanent magnet structures, such as disclosed in U.S. Pat. Nos. 6,707,360 and 7,012,495. Such switchable permanent magnet units combine the advantages of electromagnets and conventional permanent magnets without their respective main drawbacks, namely the need for an electric power source to drive an electromagnet and the non-variability of magnetic flux output of permanent magnets, ie a switchable permanent magnet does not require an electric power source and can be switched to exhibit an external magnetic field between strong and weak (practically zero) and values between these extremes. For more details, refer to said US patents, the contents of which are incorporated herein by way of cross-reference.

The use of magnet units which are capable of providing a variable magnetic flux, such as said switchable permanent magnet units and electro-magnets, provides an important additional aspect of the invention in that the variability of the magnetic attraction force enables application and machine embodiments where a ferromagnetic work piece can be selectively engaged by the rotatable pole extension elements, magnetically secured thereto for spatial manipulation upon activation of the magnetic flux source, and ultimately released there from upon deactivation of the magnet.

Before turning to additional aspects and application fields of the present invention, as well as additional features that may find inclusion in preferred embodiments of the above broad inventive concepts, reference shall be made to the accompanying FIGS. 1a, 1b and 1c, which represent highly schematic illustrations that will help in understanding basic principles underlying the present invention. It shall be understood that the below explanations rely on approximations, idealisations and simplifications of the in part relatively complex phenomena observed and present in magnetic circuits.

Turning first to FIG. 1a, it illustrates what shall here be termed as a Magnetic Wheel unit 10, consisting of two disc-shaped wheels 12, 14 and a bar-(or cylindrically) shaped dipole permanent magnet 16. These components represent a basic unit that can be built upon, modified and incorporated in numerous applications of the invention as explained below.

The magnet 16 will be a high coercive, ie rare-earth magnet capable of inducing high magnetic flux densities across air gaps (mainly) through its axial end faces 16a, 16b, and generate a pulling force (magnetic attraction force) in a ferromagnetic body towards the axial end faces as outlined above.

The discs 12, 14 have a circumferential contact surface 13a and two axial faces 13b and 13c, and are made entirely of ferromagnetic soft steel.

The discs 12, 14 are respectively located opposite an axial end face 16a, 16b of magnet 16, keeping a fixed small air gap (not illustrated in FIG. 1), such that each disc provides an oppositely polarised pole extension for the respective N- and S-pole 20, 22 of the magnet 16. Furthermore, the discs 12, 14 are supported at not illustrated axle members about a common axis of rotation 18 to allow rotation thereof, ie the discs can be termed as freely spinning pole extension 'wheel' pieces which otherwise maintain a fixed spatial relationship to the dipole magnet 16, the axis of rotation being parallel or coinciding with the N-S magnetisation axis of the dipole.

Magnetic flux transfer from the magnet 16 to the discs 12, 14 will take place across the small air gaps between the facing sides 13b of the discs and the poles 20, 22 of the magnet 16. The gaps are intended to minimise friction loses at the interface between magnet 16 and pole pieces 12, 14, but could be replaced with magnetisable roller bearings that provide for direct physical contact between discs 12, 14 and the magnet's axial end faces and thus improved flux transfer between magnet and pole discs 12, 14.

When the surface of a ferromagnetic substrate, eg steel sheet 24, is brought into contact with the peripheral surface 13a of both pole discs 12, 14 of the Magnetic Wheel Unit 10, a closed magnetic circuit will be created, wherein a closed magnetic flux loop will comprise a path internal to the magnet 16 and pole extension discs 14, 16, and a path external to the unit 10 between the pole extension discs 14, 16 and the ferromagnetic substrate 24. That is, the external magnetic field extends within the substrate 24, and this is schematically illustrated at 26 in FIG. 1a, and the entire closed loop flux path at 27 in FIG. 1b.

The Magnetic Wheel Unit 10 will be attracted and remain strongly secured to the substrate 24, despite the actual physical contact area between the discs 12, 14 and the steel sheet 24 being essentially confined to a line measuring the sum of the thicknesses (ie widths) of the disc 12, 14. The free-spinning nature of the disc wheels 12, 14 allows translational displacement of the unit 10 over the surface of the substrate 24 by applying but a very small force traverse to the magnetic attraction force which attaches the Wheel Unit 10 to the substrate 24. The small force requirement stems from the relatively low rolling resistance coefficient applicable to steel discs rolling on a steel substrate, which is magnitudes smaller than the static and the kinetic friction coefficients applicable to the same material-pair combination but where the pole wheels 12, 14 are kept in an immobilised state with respect to the magnet 16 and the surface on which such static wheels would otherwise glide.

It would seem counterintuitive that despite the presence of air gaps between magnetic flux source 16 and rotatable pole discs 12, 14, and a very small contact area between pole piece discs 12, 14 and substrate 24, the Magnetic Wheel unit 10 will remain securely attached to the substrate. A prototype Magnetic wheel unit 10 embodying the principle illustrated in FIG. 1 with the permanent magnetic flux source being a rare earth NdFeB magnet having a 50 mm×40 mm 'flux source area' (ie cross-section area of the magnetic flux source normal to the polarisation axis of the magnet) capable of delivery of 1.2 Tesla magnetic flux density, with two soft steel discs (having a magnetic flux density saturation level of around 2 Tesla) with a dimension of 25 mm width×90 mm diameter and keeping an air gap towards the permanent magnet of approx 1 to 2 mm is able to attach to a ferromagnetic steel sheet of 35 mm thickness and carry a load equivalent to a 'breakaway force' of over 1200 Newton.

As noted, the actual physical contact zone or area between substrate 24 and (rotatable) pole discs 12, 14 is very small (in theory a line, given that deformation, ie 'flattening' of the soft-steel discs under load is negligible).

It has been noted that in the vicinity of the physical contact area there exist so called 'virtual pole areas', where noticeable flux transfer takes place across air, ie (a) from the peripheral surface of the pole discs either side of the contact zone towards the substrate surface and (b) from both faces of the disc near the contact zone and the substrate surface. In the present context, such air gaps do not represent and are not to be mistaken as unwanted leakage paths, rather the effective magnetic contact area between discs and substrate is enlarged, and the so called virtual poles provide an additional means of flux transfer (albeit at lower density values) from discs 12, 14 to substrate 24, thereby adding to the total pulling power available to secure the unit 10 onto the substrate 24 (or vice versa). These virtual pole area extensions are schematically illustrated at 30a, 30b and 31a and 31b in FIG. 1b and in FIG. 1c, and do contribute in maintaining a closed magnetic circuit of sufficient quality at the interface between substrate and Magnetic Wheel unit 10 for the exerted attraction force to remain high, as exemplified above.

FIG. 1c illustrates a magnetic field line model with measured flux density values at two soft-steel 90 mm diameter×25 mm thickness pole discs 12, 14 having a magnetic density saturation level of 2 Tesla, which are polarised with opposite polarities and which are held in air in spaced apart relationship on a magnetic substrate 24. It can be seen that on either side of the essentially linear contact zone 28 between pole wheels 12, 14 and substrate 24, a flux density of 2 Tesla will reduce drastically (ie the virtual pole extensions exhibit reduced flux densities), wherein at a linear distance of 10 mm the flux density is reduced to about 15% of the value at the physical contact area, and about 5% at a distance of 20 mm.

Flux transfer from the magnet 16 into the substrate 24 will thus be influenced—and limited—by (a) the shape and dimensions of the interface of the magnetic flux source (eg the flux delivery component in a switchable permanent magnet device or electromagnet) at the gap towards the pole discs, (b) 'magnetic leakage' at the air gap interfaces between the passive pole extension discs 12, 14 and magnetic flux source 16, (c) geometric and shape constraints of the discs which may not be able to 'support' (ie carry and deliver) the same flux density at the given field strength which the magnet 16 generates, (d) the nature of the virtual poles in so far as these cannot support the same flux density at the given field strength which the ferromagnetic material of the discs 12, 14 can, and (e) the total magnetic path length between flux source and ferromagnetic substrate, recalling that the magnetic pulling force by means of which any ferromagnetic body is attracted to a source of magnetic flux will vary mathematically with the square of magnetic flux density provided by the source and linearly with the contact area between the source and the attached body.

For example, a magnetic wheel unit 10 using relatively larger diameter pole discs 12, 14 as those described above, eg 3-times, will have a longer total magnetic path (due to increased diameter of discs) and the magnetising force at the contact area will be lower then and the virtual pole areas will be smaller (and in extreme situations virtually non-existent).

The actual size, shape and geometric extent of the virtual poles are not fixed but vary with the actual working and application conditions. Generally speaking, the larger the virtual pole zones can be made, the more magnetic flux transfer may take place in the vicinity of the disc-substrate interface. An important consideration is therefore the need to avoid or minimise magnetising force losses.

Consequently, in accordance with another aspect underlying the present invention, the pole wheels will be of such shape and dimensions to cater for (a) optimised flux transfer from the magnetic flux source into the rotatable pole wheels and (b) provide relatively larger area virtual poles thereby to enable optimised flux transfer also outside of the direct physical contact zone between pole discs and substrate surface, whilst (c) maintaining sufficient magnetic attraction force towards the substrate; an important point is to avoid, as far as practically possible, losses in magnetising force at each interface.

Having noted the difficulties regarding precise definition of the virtual pole zones, assuming an idealised air-gap leakage free magnetic flux path between magnet flux source (eg permanent magnet) and rotatable pole wheels, it is possible to match the size of the diameter-cross-sectional area of the wheel or roller poles as best as constructional possible to the size of the magnetic flux source area, ie the cross section of a pole in the dipole magnet perpendicular to its magnetisation axis. Such measure will produce an optimised, ie a higher magnetising force at the discs' working interface (ie air gap) with the substrate as compared to cases where the geometric dimensions of the wheel or roller pole extensions are chosen arbitrarily or without regard to magnetic flux transfer considerations.

For example, and all other parameters being equal, cup shaped wheels or rollers which are disposed to surround with their annular rim portion a determinable part of the respectively associated pole of the dipole magnet and maintain a small air gap between the wheel's internal disc face towards the axial end face of the dipole magnet, exhibit a larger total area for flux transfer into and out of such wheel than a simple planar disc-shaped wheel where the flux transfer area is confined to the surface area facing the axial end face of the dipole magnet. One could say cup shaped wheels can 'capture' a larger portion of the flux emanating from the magnet which, absent the annular rim portion of the cup which surrounds part of the magnetic flux source, would be lost as 'stray' flux, and use such additionally captured flux to generate a higher magnetic attraction force towards a ferromagnetic substrate than 'plain disc-shaped' pole extension.

The actual depth of the rim portion of the cup-shaped wheel or roller will depend on the nature of the magnetic flux source being employed, and in particular the magnetic flux 'output' member of the magnetic flux delivery device. In essence, the cup depth will represent a compromise between maximum flux transfer considerations (optimised where the annular rim portion depth is such as to extend and cover the whole length of the respective North/South pole of the magnet) and desired magnetising force (ie magnetic attraction force) which will be lower in the flux transfer optimised rim configuration. An empirically determined relative size of the annular rim with regards to its covering of the flux source is provided below in connection with a specific embodiment of the invention.

To conserve the magnetising force of the high coercitivity flux source it is also desirable to minimise the volume of the passive ferromagnetic material pole extension wheels. Viewed only from a point of view of seeking to optimise flux transfer, a theoretical necessary volume maximum is given where the effective cross section of the flux source equals the diametrical cross-section of the wheel divided by any applicable flux compression/concentration factor (the latter is determined by material specific flux density carrying capacity and the flux source density output. For example, if a flux source can provide a magnetic flux density of 1.2 Tesla and is able to generate a magnetising force sufficient to induce in mild steel a flux density of 2 Tesla, the compression factor is about 1.6). The practical maximum will be lower because of total magnetic path length and flux/wheel air gap losses.

Turning then to advantageous additional features that may be incorporated in different embodiments of the above described broad concepts.

In utilising a conventional, non-switchable magnet or preferably a switchable permanent magnet arrangement as the magnetic flux source, it will be appreciated that the magnetically active material may be encased or otherwise disposed to cooperate with other stationary pole pieces additional to the rotatable pole extension elements (ie wheels), in which case the flux will 'originate' in the active material and be made 'available' through the other stationary pole pieces that will be disposed in facing close proximity to the rotatable pole wheels. The specific shape of the stationary pole pieces will also influence flux transfer capabilities and have an effect on the maximum available magnetising force, as the poles do represent a 'load' for the magnetic field generated by the active magnetic material (ie the flux source)

In preferred embodiments of the above described Magnetic wheel units 10, use is made of a switchable permanent magnet device disclosed in said U.S. Pat. No. 7,012,495, different types of which can be sourced from Magswitch Technology Worldwide Pty Ltd (Australia) or its subsidiaries. In these flux source units, the active magnetic material is constituted by two, diametrically oppositely polarised, dipole permanent magnet cylinders, stacked within a cylindrical chamber of a two-pole-piece housing such as to allow rotation of the magnet discs relative to one another, thereby enabling the respective half-circular N- and S-pole sections of the magnet discs to be brought in and out of axial alignment with one another. The ferromagnetic (passive) two pole pieces of the housing are magnetically separated or isolated along two axially extending contact edges, wherein when the respective N- and S-poles of the stacked magnet discs are rotated into full alignment, the diameter separating the N- and S-poles of the magnet discs will extend between the contact edges of the housing, thereby causing one of the pole pieces to be polarised and provide a N-pole pole extension and the other a S-pole pole extension.

Such switchable dipole magnet unit may then constitute the magnetic flux source 16 in FIG. 1a, wherein flux transfer into the rotatable pole discs 12, 14 will take place from the magnet discs through the housing pole pieces and across the air gap between housing pole pieces and the pole wheels located in facing proximity to the two pole pieces of the housing, respectively. The wall thickness and exterior shape of the pole piece housing can be chosen to provide a flux source unit having a constant magnetic field or approx. constant magnetic flux about the periphery of the housing, and spatial orientation of the unit's housing with respect to the rotatable pole wheels can be determined as required. The specific choice of switchable permanent magnet unit can be made by reference to information available from Magswitch Technology Worldwide, depending on load carrying requirements.

As noted above, it is conceivable to have the facing surfaces of the pole wheels and magnetic flux source unit coated with a low friction material and provide for the presence of soft steel roller bearings at the interfaces unit-pole wheels. In practical implementations it is however technically feasible to maintain very small air gap tolerances between the movable and stationary components whilst not significantly negatively affecting magnetic flux transfer across the air gap. In the end, the specific application environment will dictate air gap distance requirements.

Equally, applications are conceivable where the pole wheels are mounted to allow free rotation about an axle whilst allowing displacement towards and away from the axial end faces of the magnet, so that they can be selectively brought into and out of frictional engagement therewith, whereby an integral clutch and/or brake can be implemented at the magnetic wheel unit itself.

As already noted, vehicular and stationary implementations of the invention may incorporate driven or idle pole wheels or rollers. The circumferential surface of the wheels and rollers may have a friction coefficient enhancing or reducing coating, as required, for improving traction or reducing friction at the wheel-substrate interface, depending on whether the wheels are traction or idle wheels.

Coating materials may include thin-film rubbers, preferably incorporating ferromagnetic particles, flecks, powders etc to increase the value of relative magnetic permeability of such coating to reduce flux transfer losses whilst maintaining the improved friction coefficient which such rubberised coating provides. The wheel contact surface can have different 'textures', eg smooth for low traction or profiled to increase "bite" for higher traction. Coating may also include processes and use of substances aimed at increasing the overall hardness of the wheel or roller surface, eg Titanium Nitride to achieve more slipperiness (smooth surface) or higher friction (textured surface). Noise reducing coatings are equally conceivable, whereas coating films aimed at preventing extraneous matter adhering onto the wheel/roller peripheral surface are particularly advantageous in 'dirty' application fields such as steel sheet handling operations, use of magnetic wheel units in vehicles employed as remote controlled painting, brazing, welding and other applications.

A device incorporating one or more magnetic wheel units of the type generically discussed above, can advantageously incorporate drive, means, such as a motor, arranged for transferring torque into at least one of the wheel or roller (pole piece) members. The torque available at the wheel or roller members can then be used to impart propulsion to an object in contact with the wheels (eg metal sheet conveying), self-propel a vehicle incorporating the magnetic wheel unit(s), or where the torque transferred is a 'negative' torque aimed at reducing the rotational speed of the wheels where such are caused to rotate by an external force, slow down or brake an object that is in frictional contact with the wheels.

The pole extension wheel members can be made advantageously from soft steel or other ferromagnetic passive materials. An advantageous wheel design may consist of a composite material consisting of a plastic material or rubber matrix in which is dispersed a considerable amount of ferromagnetic material powder for flux carrying purposes. Deformability of the pole extension wheel at its interface with the substrate on which its rests under magnetic load will enlarge the contact zone where flux transfer takes place directly between wheel member and substrate, also providing increased frictional engagement therewith.

It will be appreciated, that the external peripheral surface of the pole piece wheels or rollers may be smooth, textured, corrugated or provided with other type of protrusions, eg cog wheel teeth. The choice of wheel surface properties may be such so as cooperate with a complementarily prepared surface of the substrate with which the magnetic wheel unit will interact. For example, in a friction wheel gearbox and variable ratio drive arrangement incorporating one or more basic magnetic wheel units having smooth, non-corrugated pole wheels or rollers, the inherent slippage functionality which such provide when rolling on another smooth-surface object can be used to minimise overload conditions as torque transfer is reduced due to slippage. Of course, where slippage in the torque transfer between pole wheels or rollers and substrate is not desirable, form-interlocking complementary pole wheel or roller and substrate surfaces may be employed, eg surfaces having gear teeth.

A particularly useful embodiment of the invention will be in a vehicular application that includes means for self-propelling the vehicle on the substrate surface, regardless of whether the means for self-propelling include an arrangement for transferring torque which cooperates with the pole wheels or rollers for the latter to effect torque transfer onto a ground or wall surface, or whether the propulsion unit is independent from the magnetic wheel unit(s) present in such vehicle, eg a separate traction wheel drive.

The torque transferring arrangement can be devised to suit a given application field, and may include one or more of a belt drive, a sprocket wheel drive, a chain drive or a worm gear drive or combinations thereof.

A preferred option for a torque transferring arrangement includes one or more friction rollers disposed to transmit torque by engagement with an outer circumference of at least one of the pole wheel or roller members. The friction rollers may be selectively brought in and out of engagement with and biased against the wheel members using a separate mechanism, but advantageously the friction rollers could incorporate ferromagnetic materials operatively arranged for biasing the rollers into and holding contact with the wheel member(s) through magnetic force.

In yet a further, vehicular, self-propelled device implementation of the present invention, means can be provided for restricting rotational movement of the pole wheel or roller members in one direction only, eg so that the wheels can rotate either clockwise or counter-clockwise, but not both. This measure increases traction efficiency in slippage, situations by removing the otherwise present bi-directional freewheeling characteristics present in normal wheel axles.

Also, it is advantageous to provide mechanisms or implements aimed at preventing roll-back of a vehicle employing one or more Magwheel units having propelling (ie torque transmitting) wheel members climbing along steeply inclined or vertical surfaces whilst remaining magnetically attached thereto. One implementation sees the provision of brake pads or blocks that are selectively movable into a location between wheel member(s) and substrate surface immediately behind the contact area wheel(s)-substrate surface, thereby to provide a wedging action preventing backward rolling of the wheel(s).

Another roll-back prevention mechanism may be constituted by a see-saw like arresting frame, wherein a substantially u- or bracket shaped frame member is mounted for rotation about but otherwise secured to a common axle to both pole wheels such that the frame's two parallel lever arms can be rotated to come with their respective terminal ends into forced engagement with the substrate surface on which the wheels are magnetically attached. The lever arms may themselves be constituted by bent bar sections, eg L-bent arms pivoted at the intersection of the angled arm portions at the axle, thereby to provide a pull lever arrangement wherein the braking force is a leveraged factor of the magnetic attraction force provided by the wheel assembly itself.

In a vehicular embodiment incorporating four or more pole wheels, wherein a switchable permanent magnet device is associated with one wheel pair, provision of a suitable mechanism that enables the selective switching on and off (or variation of the magnetic field intensity output) of the individual switchable magnets provides a number of advantages. Not only will such selective 'magnetic activation and deactivation' of individual wheel pairs facilitate operational disengagement of the vehicle from the substrate, it will also facilitate the vehicle being able to climb over step-like obstacles or transitions between a horizontal and a steeply inclined or vertical surface, in that forward pair of wheels reaching such path change location may be 'demagnetised' thereby to render them magnetically inoperative, whereby they can then lift-off from the initial surface and engage the inclined surface, whereupon they may be 'remagnetised' and allow the vehicle to transition onto the inclined surface. The rearward located wheel pair will be switched accordingly as it too reaches the path discontinuity.

Vehicular application fields of the invention include motional robots which can be magnetically attached to ferromagnetic substrates (ie structures and objects) like ship hulls, submarine hulls, pipelines (inside and outside). Such robots may carry a variety of appliances such as cameras, all types of sensors employed in detecting of faults in a structure or perform other tasks, eg transporting a cable through a pipeline, cleaning a pipeline, etc. For example, underwater optical and structural inspection of the hull of a moving and submerged submarine hull can be accomplished using a remote-controlled robot having a streamlined body in which are received a suitable number of Magwheel units of general type discussed above, which allow the robot to remain securely attached to the hull whilst being propelled along a desired inspection path.

The skilled person will further appreciate that sensor systems, motion control equipment, either for remote controlled operation or on-board controlled operation using signal processing equipment, motor management electronics and power source, and other type of vehicle management equipment can be accommodated in the vehicle support structure of a self-propelled vehicle as required by the specific application environment of the vehicle.

The skilled person would also be aware of different types of axle systems and vehicle chassis types that could be employed in creating a vehicle embodying the invention.

Further features and other aspects of the invention will be noted also from the following description of a number of preferred implementations and embodiments of the invention, with reference to the accompanying drawing. It should be noted, however, that the invention is not restricted to the application fields outlined above, and may be implemented in different forms.

BRIEF DESCRIPTION OF THE DRAWINGS

FIGS. 4a, 4b and 4c are schematics by way of which is illustrated how to optimise rotatable pole piece geometries with regards to the chosen magnetic flux source in a magnetic wheel unit as per FIG. 2a.

DESCRIPTION OF PREFERRED EMBODIMENTS

Figure 1A:
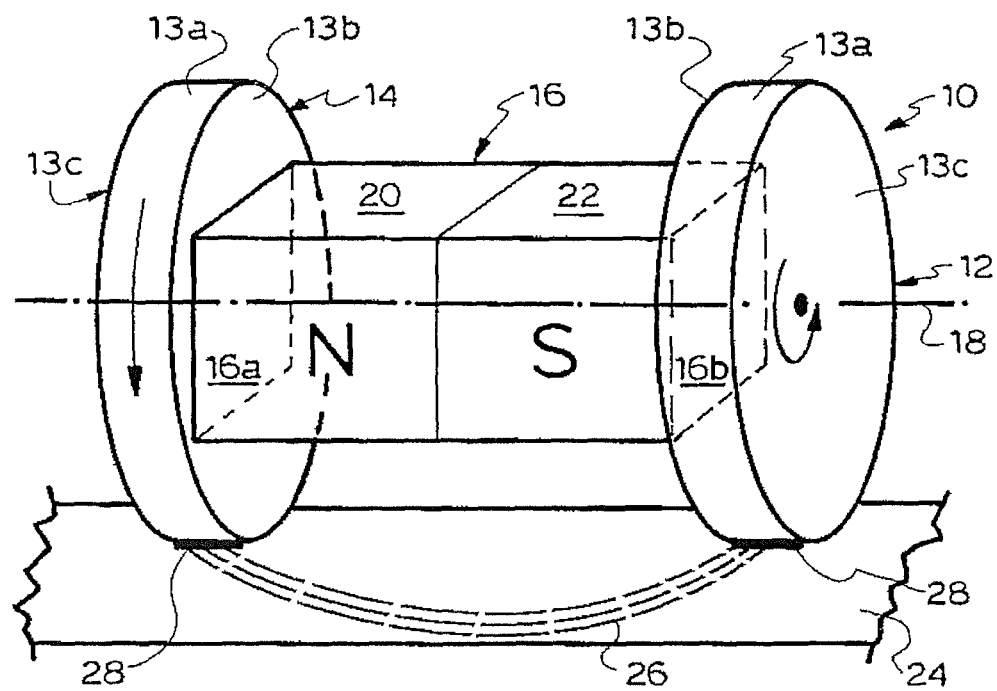
FIGS. 1a, 1b, and 1c are highly simplified schematic illustrations of basic concepts underlying the present invention.
Figure 1B:
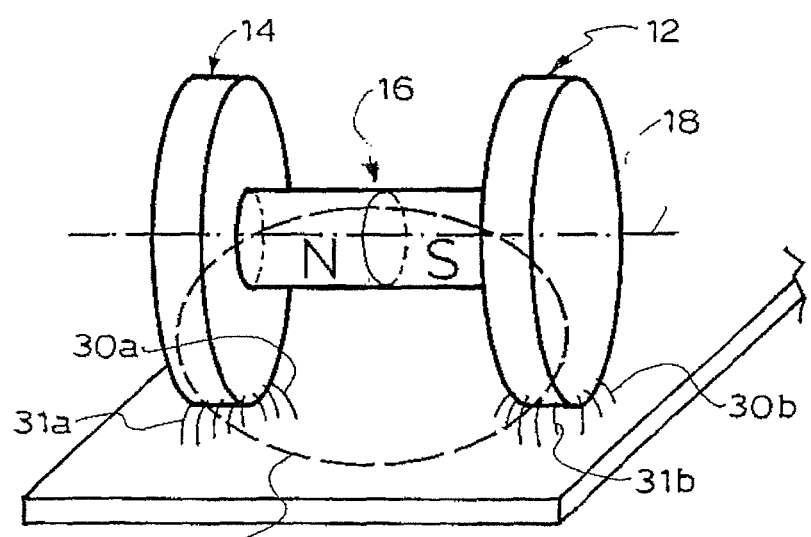
Figure 1C:
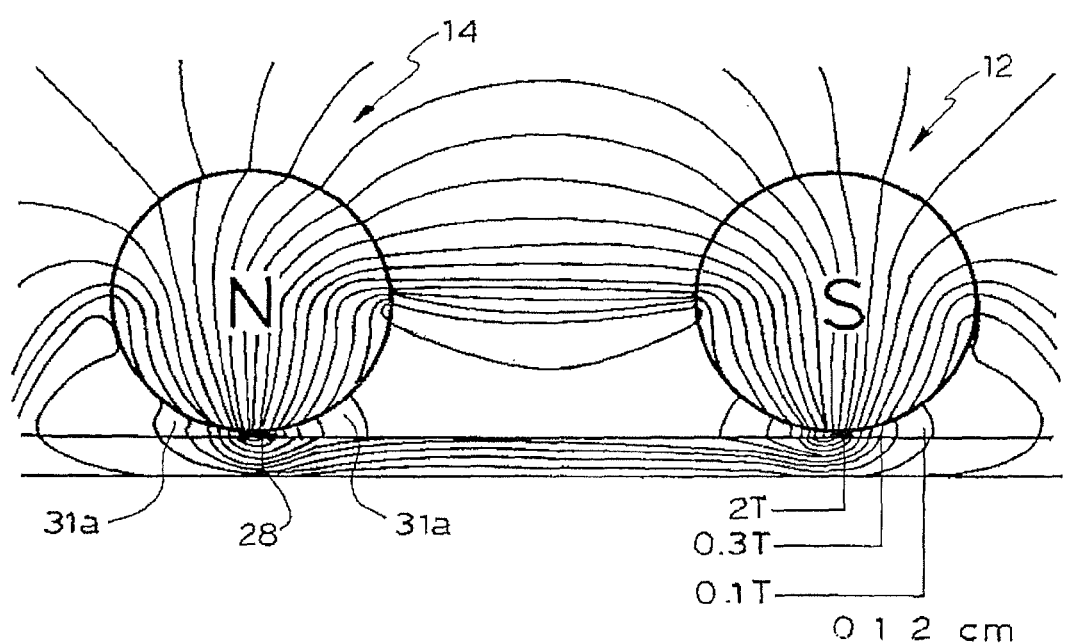

A basic magnetic wheel unit as illustrated in FIGS. 1a and 1b has already been described above. Such units can be incorporated in numerous and different machines and appliances. It should be noted that the active magnetic material (ie permanent magnets) or other magnetic flux source (eg electromagnet) can be received within a dedicated housing; thus, the actual shape of the magnetic flux unit 16 in FIGS. 1 and 2 is illustrative only and not representative of the actual shape of such units.

Figure 2A:
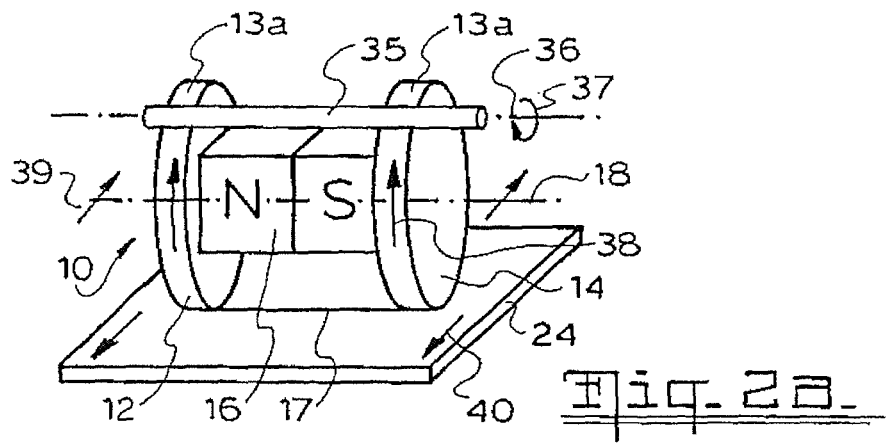
FIGS. 2a to 2c are schematic illustrations of different configurations of rotatable pole wheel arrangements used with different magnet configurations, wherein FIG. 2a also illustrates a ferromagnetic friction roller used to impart (or receive) torque from the rotatable pole wheels.
Figure 2B:
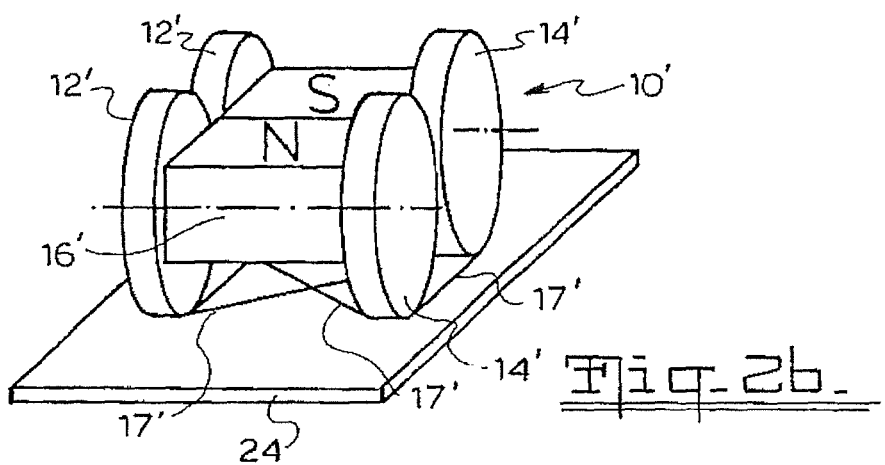
Figure 2C:
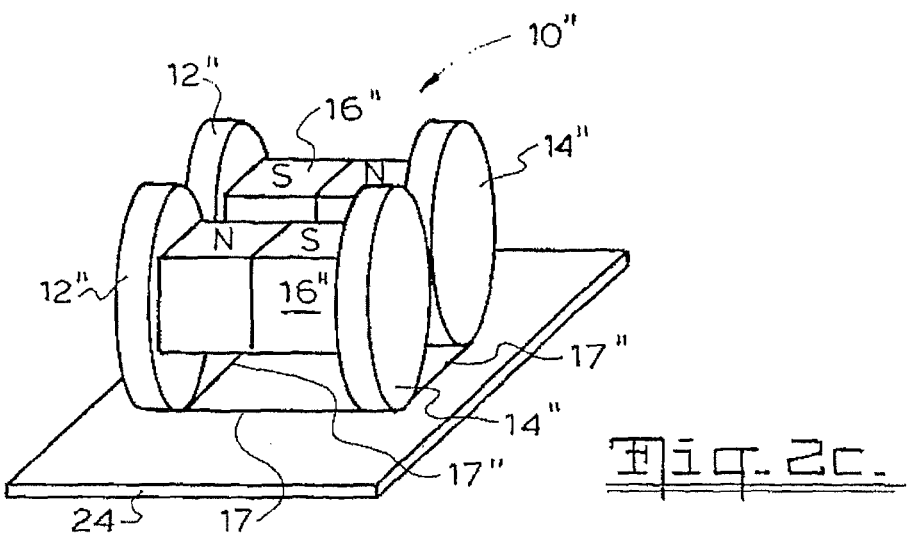

As can be best understood by having reference to FIGS. 2a to 2c, depending on the number of and specific types of dipole magnets employed as magnetic flux source, magnetic wheel units having different pole wheel numbers and arrangements are possible.

FIG. 2a illustrates a twin wheel configuration unit 10 utilising a single magnet 16 and two rotatable pole wheels 14, 16 as previously described with reference to FIG. 1a.

FIG. 2b illustrates an arrangement with two pairs of pole wheels 12', 14', one pair at the N-pole and one at the S-pole of the bipolar magnet 16', ie a four-wheel magnetic wheel unit 10' with single magnetic flux source 16'.

FIG. 2c in contrast illustrates a four-wheel magnetic wheel unit 10" with two spaced apart magnetic flux sources 16" (which can but need not be identical with regards to magnetic flux density delivery qualities), wherein each magnet 16" is associated with one pole wheel pair 12", 14". It may be noted that the magnetisation axis extending between N- and S-poles of the two magnets 16" are orientated in opposite directions to one another, but this need not be the case in practical embodiments of such unit 10".

The lines 17, 17' and 17" in FIGS. 2a to 2c, respectively illustrate in crude but figuratively correct manner external flux transfer paths that will be present in the substrate 24 (being represented by a steel plate) that respectively exist between the polarised pole wheels of the different units 10, 10' and 10". Given that the magnetic permeability of the ferromagnetic substrate is by magnitudes higher than that of the surrounding environment, be it air or another fluid like water, and assuming the substrate properties are such that no flux saturation takes place during flux transfer into the substrate, one would not observe any magnetic field outside the immediate vicinity of the contact area between pole wheels and substrate (refer above to virtual pole extension areas) and the closed magnetic circuit comprised of the pole wheels, substrate and magnetic flux source device.

Magnetic wheel units 10 (or 10' or 10") can be embedded and embodied in a multitude of apparatus and devices for a variety of applications.

Turning first again to FIG. 2a, it schematically illustrates one methodology of effecting torque transfer either into or from the pole wheels 12, 14 of unit 10, by means of a ferromagnetic roller bar 35 whose axis of rotation 36 along the axial length of the roller is positioned to extend parallel to the axis of rotation 18 of the pole wheel pair. The roller bar 35 has a smooth outer peripheral surface and is held by any suitable mechanism (not illustrated) such that it is in, or can be brought with its outer surface into and out of frictional abutment on the smooth peripheral surface 13a of both wheels 12, 14. This basic architecture can then be employed to effect torque transfer, either positive for propulsion purposes or negative for object braking purposes. For example, rotation of roller bar 35 as per arrow 37, eg by coupling the roller with the output shaft of an electro motor, will impart counter-orientated rotation to wheels 12, 14 as per arrow 38 which in turn will then either allow the entire unit 10 to move in translatory manner over a stationarily held substrate 24 as per arrows 39, or where the unit 10 is otherwise secured against movement, impart movement onto an otherwise unsecured substrate 24 as per arrows 40 in a direction opposite to 39.

In using an appropriately dimensioned ferromagnetic roller bar 35, it is possible to 'utilise' part of the magnetic energy provided by the magnetic flux source 16 of unit 10 to maintain roller 35 in frictional and magnetic contact with wheel members 12, 14 whilst the majority of the available magnetic flux is utilised to secure the unit 10 onto substrate 24. It will then also be appreciated that where the magnetic flux source 16 is a switchable permanent magnet device or an electromagnet, variable torque transfer may be effected, dependent on the amount of flux transferred into roller 35 (and substrate) through wheel pole members 12, 14, and the friction coefficient that then will be present between the abutting surfaces of wheels 12, 14 and roller 35. The architecture illustrated in FIG. 2a provides for an inherent torque slippage functionality which can reduce torque transfer between unit 10 and substrate 24 in conditions that may otherwise lead to an overload.

Figure 3A:
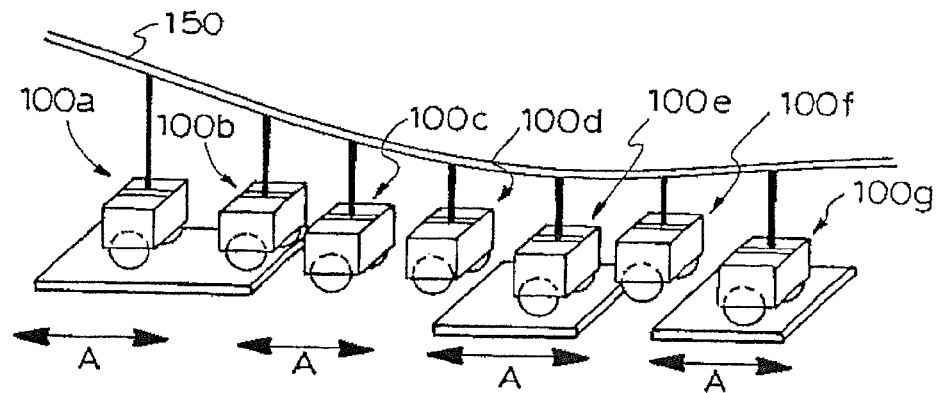
FIGS. 3a to 3c are schematic illustrations of implements and devices in which the present invention can be embodied.

A more specific application field for magnetic wheel units include roller conveyor systems in various forms like overhead sheet metal conveyors, one of which is schematically illustrated in FIG. 3a. A plurality of 2-wheeled magnetic wheel units 100a to 100g embodying the concept described with reference to FIG. 2a (but with a different torque transmission architecture) are suspended from a ceiling rail 150 in predetermined distance from one another along the extension or travel path defined by rail 150. Each unit 100a to 100g includes one pair of pole wheels accommodated within a suitable gondola-like housing in which is received a switchable magnet that provides magnetic flux to the respective wheel-pairs. A suitable motor is used to impart selective rotation to the pole wheels of the units. A steel plate 140 can be conveyed along travel path A held magnetically attached successively at units 100a to 100g. Alternatively, units 100a to g could be 4-wheeled units as illustrated in FIG. 2b or 2c, in which case one wheel pair would be driven and one pair could be magnetic idle pole wheels. In yet a further alternative, guide rail 150 could be replaced with a chain belt or similar conveyor line on which the units 100a to 100g can be secured; the units 100a to 100g could then all comprise idle pole wheels, given that locomotion is provided by the chain drive itself.

Figure 3B:
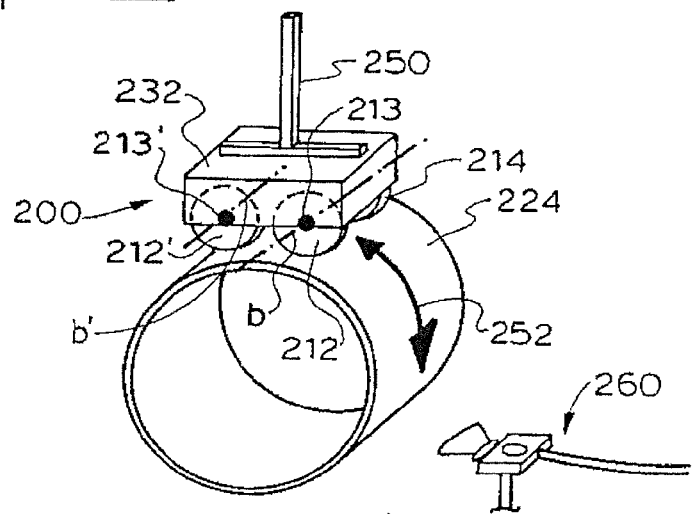

FIG. 3b illustrates an application wherein a 4-wheel magnetic wheel unit 200 embodying the concept illustrated in FIG. 2c serves as a magnetic vice for releasably securing a tubular ferromagnetic work piece 224 whose outer surface is to be powder coated by atomiser apparatus 260. The pole wheels 212, 214, 212' (and the counterpart not illustrated fourth wheel member) are respectively secured for rotation about axle bolts 213 and 213' mounted at and within a box-like support body 232. The two magnets (not shown) respectively associated with the pole wheel pairs 212, 214 (212') are mounted within the support body 232 in such manner that the magnetic N-S pole axis of each switchable magnet coincides axially with the axis of rotation b and b' of the respectively associated pole wheel pairs. Ref numeral 250 serves to denote a support member by means of which the magnetic vice unit 200 can be secured to a support structure, which itself could be an articulated arm that would enable the vice unit 200 to be orientated in space as desired.

Whilst it is feasible to incorporate a motor unit in order to drive one or more of the pole wheels of unit 200, the illustrated embodiment simply serves to magnetically hold work piece 240 securely in space whilst allowing rotation thereof as indicated by arrow 252 about its longitudinal axis.

This same device 200 could be used to magnetically clamp two tubular pipe sections in end to end abutting relationship, thereby enabling other operations to be carried out, such as butt welding of the pipe sections.

Figure 3C:
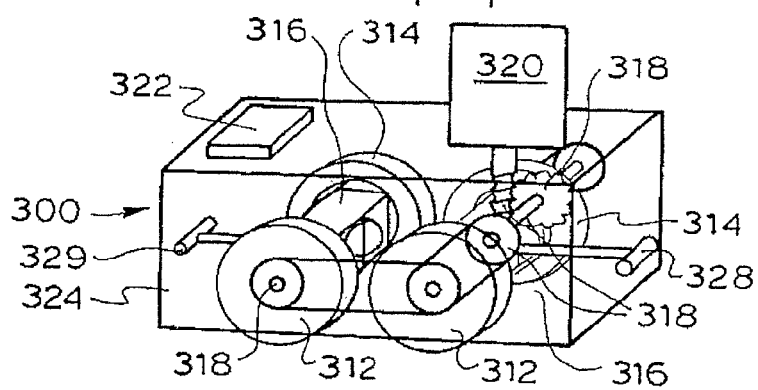
Figure 4A:
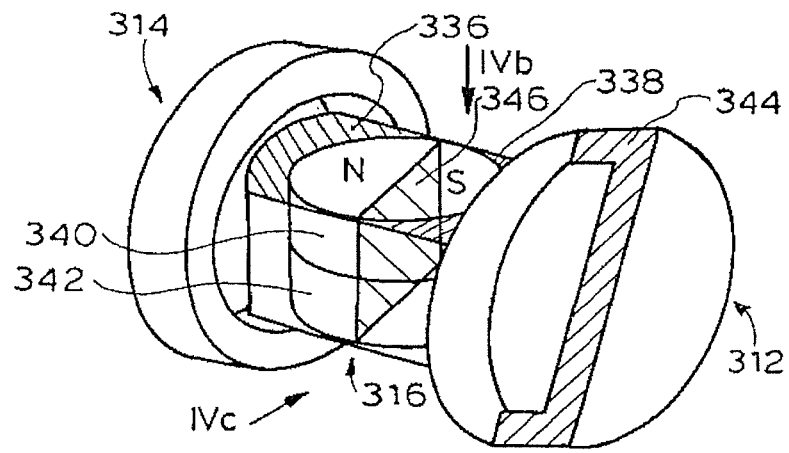
Figure 4B:
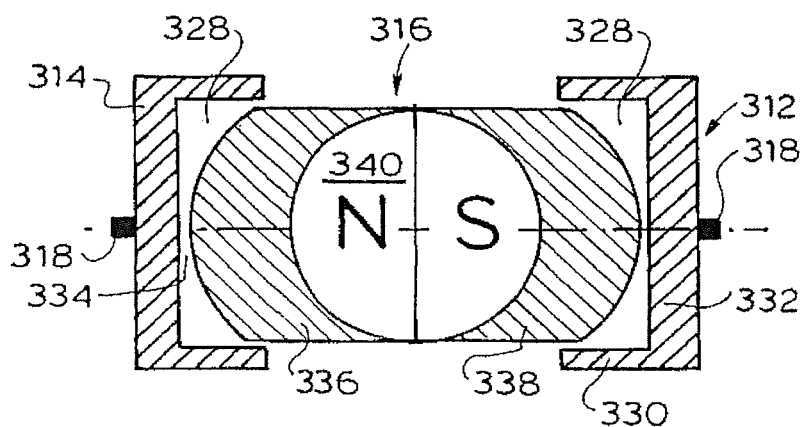

FIG. 3c illustrates in schematic perspective view a self propelled prototype of a Magnetic Trolley (vehicle) 300, which essentially consists of two identical, independently manually switchable permanent magnet units 316 generally of the basic type described in U.S. Pat. No. 7,012,495, two cup-shaped pole wheel pairs 312, 314 respectively associated with the magnetic flux sources 316, a prime mover in form of an electric motor 320, a not-illustrated power supply for the motor, eg battery pack, a drive train arrangement 318 for transferring torque from the motor 320 into all four of the pole wheels 312, 314, an on-board vehicle control system 322 as would be employed in either remote wirelessly controlled vehicles or on-board computer controlled vehicles, and a shoe-box-like vehicle body 324 on which all of the aforementioned components are mounted. The individual pole wheels 312, 314, which are cylindrically cup shaped as detailed in FIGS. 4a and 4b, are journaled at respective axle elements 326 fixed to the side walls of the vehicle body 324. The drive train arrangement 318 includes a belt and pulley system kinematically coupling all four wheels 312, 314 with a driven gear axle supported at body 324 whose cog wheel meshes with a helical screw shaft coupled to an output shaft of the electric motor 320. Reference numerals 328 and 329 serve to denote lever arms utilised for switching of the magnets 316 between their respective activated states, in which a strong external magnetic field is emitted and present, and a deactivated state, in which the magnets 316 are 'turned-off' and no external magnet field is present.

Figure 4C:
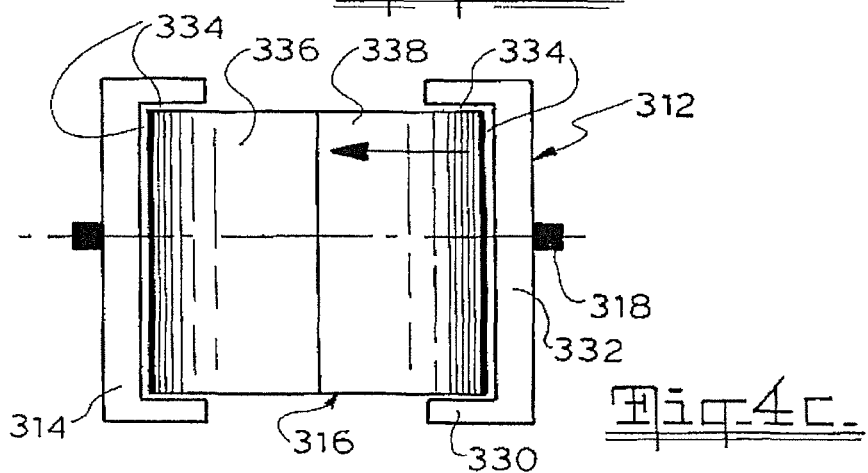

As may be best appreciated with reference to FIGS. 4a to 4c, which show a simplified isometric representation of an individual magnetic source unit 316 with its associated pole wheel pair 312, 314, and top and front plan views along arrows IVb and IVc in FIG. 4a, the magnetic flux source units 316, which are respectively secured within the vehicle body 324 in a fixed location between each associated pole wheel pair 312, 314, are located such that the N-S magnetic axis of each magnet unit 316 (in the activated state) extends coaxially with the wheel axles 318. Each unit 316 extends with its two respective axial ends into the cylindrical void 328 defined within the annular rim flange 330 of the wheels 312, 314 and to be in facing relationship with the terminal disc web 332 of the wheels 312, 314. A very small air gap 334 is maintained between the two stationary pole extension pieces 336, 338 that form the housing of the unit 316 in which is received the two diametrically polarised permanent magnet cylinders 340, 342 that provide the active, but switchable, permanent magnetic flux source of the unit 316 (compare above and U.S. Pat. No. 7,012,495).

A prototype vehicle according to FIG. 3c (using the unit of FIG. 4a) was constructed, using four cup-shaped pole wheels having an outer diameter of 90 mm, a rim wall thickness of 25 mm, a disc web thickness of 25 mm (thereby defining a flux transfer cross-sectional area of 1375 mm2, see FIG. 4a, at 344) and made of soft-steel having a magnetic flux saturation limit of about 2 Tesla. The peripheral surface of the cups was uncoated and machined to a smooth finish as viewed by the naked eye.

The magnetic flux source units comprise each a switchable permanent magnet unit of type M5040 sourced from Magswitch Technology Worldwide and capable of delivering (in unloaded circuit conditions) 1.2 Tesla at the relevant passive stationary pole surface employed in flux transfer, wherein the magnetic flux area of the active magnetic material (ie the two cylindrical, stacked magnets) totals 2000 mm$^2$ (see FIG. 4a at 346).

The choice of (available) magnetic flux source, ie M5040 magnets, which given the shape of the magnetic field generated in the 'turned-on' state are similar to wide pole magnets with non-uniform magnetic field distribution, influences also their spatial arrangement with respect to the cup-shaped wheels as well as the dimension (in axial direction of the wheel members) which the rim wall of the wheel should have in order to achieve an optimised flux transfer and magnetic field force generated attraction force. Because the wheel pole members constitute a load with respect to available magnetic force, the depth of the rim portion is chosen such that it covers (surrounds) the M5040 magnet up to a location where the magnetic field intensity measured along a line running perpendicular to the N-S-pole diameter separation line is about 0.7 of the maximum field value, see FIG. 4c, which is about 12.5 mm in the chosen configuration.

The total weight of the vehicle including all drive train and control components, vehicle body and a welding appliance mounted thereon was recorded at around 12 kg (a single magnetic wheel unit consisting of magnetic flux source 316 and cup wheel poles 312, 314 weighs about 3 Kg).

Load carrying experiments conducted with vehicle 300 demonstrated that the breakaway force required to vertically lift-off the vehicle whilst in magnetic attachment on a horizontal clean steel sheet amounts to around 2400N, and the vehicle was able to generate a traction force of around 400N on a clean steel sheet substrate.

Flux transfer efficiency between the active magnetic material of the switchable flux units 316 and the substrate was determined to be about 50%.

Experiments have been conducted which suggest that the four-wheeled self-propelled trolley as described is capable of safely transporting an additional payload equal its own weight along a vertically inclined steel sheet.

It will then be appreciated that such trolleys may be used to mount all kind of instruments and appliances that can be safely conveyed along inclined, vertical and even overhanging ferromagnetic surfaces, or may be incorporated into other structures that require safe attachment to a ferromagnetic structure in displaceable manner.

For example, switchable magnetic wheel units as illustrated can be incorporated in all types of working platforms that are suspended from above to carry out maintenance and other work on vertically inclined ferromagnetic surfaces, eg a ship's hull, thereby providing a means of safely magnetically attaching the platform to the ship hull without inhibiting up and downward movement of the platform.

Figure 5:
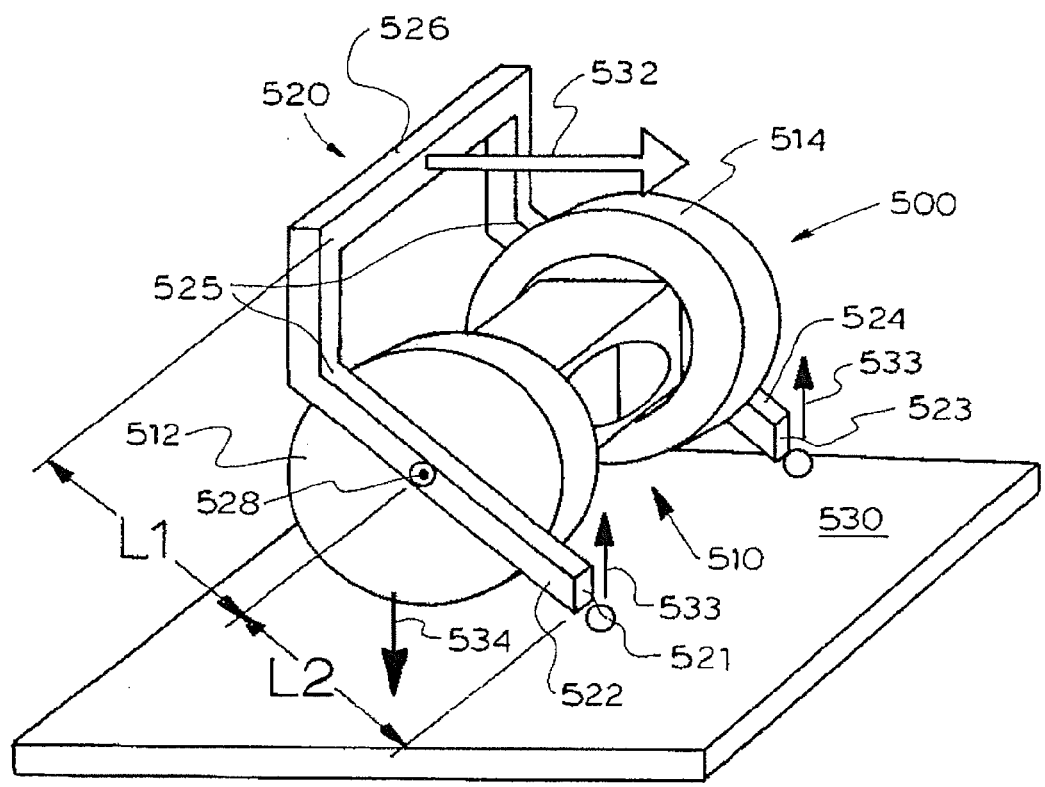
FIG. 5 is a schematic illustration of a magnetic wheel unit braking arrangement which translates some of the available magnetic attraction force into a braking force.

Turning lastly to FIG. 5, it illustrates schematically a magnetic wheel climb-crawler 500 incorporating a magnetic wheel unit 510 of similar type to the one illustrated and described with reference to FIGS. 4a to 4c, with similar dimensions as referred to above, which additionally incorporates a motion arresting frame 520 which can be selectively swivelled in and out of engagement with the substrate on which the unit 510 is attached for travel. The frame 520 is a substantially u- or bracket having two parallel arms 522 and 524 incorporating a bent 525 along their length and a traverse handle arm 526 at an opposite end to the free terminal ends 521 and 523 of the arms 522, 524.

The frame 520 is mounted for rotation about but otherwise secured to the common axle 528 of both pole wheels 512, 514 such that the frame's two parallel lever arms can be rotated to come with their respective terminal ends 512 and 523 into forced engagement with the substrate surface 530 on which the pole extension wheels 512, 514 are magnetically attached.

The lever arm geometries, in particular the ratio of length L2 between the free ends of arms 522 and 524 and the pivot point at 528 and the length L1 between pivot point at 528 and the traverse bar section 529, where force 532 may be exerted in order to rotate the frame 520, will determine the leverage between the force 533 that can be applied at the contact point of the free ends of arms 522, 524 with the substrate and the reaction force 534 which is provided by the magnetic attraction force exerted between wheels 512, 514 and substrate.

The principle of the device 500 can be employed in devices intended for climbing a vertical ferromagnetic wall, where backward slippage due to low friction coefficients between wheels and substrate is insufficient to secure positive traction forces. It will be appreciated that the arresting device may also be used to counter forward slipping, as the relevant motion pattern of the unit and the location of ground engagement of the arresting device ahead or behind the pole wheels will dictate the functionality of the arresting device.

The invention claimed is:

1. Magnetic apparatus comprising (a) one or more switchable permanent magnet devices as a source of magnetic flux exhibiting a N- and a S-pole, (b) at least two oppositely polarizable pole extension bodies associated with the N- and S-pole, respectively, of the magnetic flux source, and (c) a support structure at which the at least one switchable permanent magnet device is mounted in stationary manner, wherein the pole extension bodies are cup-shaped wheel or roller members with an outer annular surface and are held rotatable about respective axes of rotation at the support structure, and wherein the N- and S-poles extend physically into an interior of the respectively associated one of the cup-shaped wheel or roller members, whereby when a counter body having ferromagnetic properties is brought into magnetic contact with the peripheral surface of the rotatable pole extension bodies, an external flux path for the magnetic flux from the at least one switchable permanent magnet device is provided.

2. Magnetic apparatus according to claim 1, wherein the apparatus is a vehicle arranged for travel on the counter body, whereby resting of the wheel or roller members on the surface of the counter body creates a closed magnetic circuit encompassing the switchable permanent magnet device, pole extension wheel or roller members, and the counter body.

3. Magnetic apparatus according to claim 1, wherein the apparatus is a support appliance capable of magnetically retaining attached to it in an otherwise displaceable manner a magnetically attractive body, whereby bringing the magnetically attractive body into surface contact with the peripheral surface of the wheel or roller members creates a closed magnetic circuit encompassing the switchable permanent magnet device, pole extension wheel or roller members, and the magnetically attractive body.

4. Magnetic apparatus according to claim 2, wherein the at least one switchable permanent magnet device comprises at least one dipole magnet having a stationary pole member associated with each N- and S-pole and which is supported such as to maintain an air gap to the wheel or roller pole extension members.

5. Magnetic apparatus according to claim 3, further including drive means arranged for transferring torque into at least one of the pole extension wheel or roller members.

6. Magnetic apparatus according to claim 2, wherein the vehicle is capable of magnetically attaching in an otherwise displaceable manner to a magnetically attractive body, whereby bringing the magnetically attractive body into surface contact with the peripheral surface of the wheel or roller members creates a closed magnetic circuit encompassing the switchable permanent magnet device, pole extension wheel or roller members, and the magnetically attractive body, the vehicle further including a means for self-propelling the vehicle on the surface of the magnetically attractive body.

7. Magnetic apparatus according to claim 6, wherein the self-propelling means include an arrangement for transferring torque to at least one of the pole extension wheel or roller members from an on-board motor.

8. Magnetic apparatus according to claim 5, wherein the drive means include one of a belt drive, a sprocket wheel drive, a chain drive or a worm gear drive or combinations thereof.

9. Magnetic apparatus according to claim 8, wherein the drive means include one or more friction rollers disposed to transmit or receive torque by engagement with an outer circumference of at least one of the wheel or roller members.

10. Magnetic apparatus according to claim 9, wherein the friction rollers incorporate ferromagnetic materials operatively arranged for biasing the rollers into and holding contact with the wheel or roller member(s) through magnetic force.

11. Magnetic apparatus according to claim 8, wherein the drive means include a gear box or arrangement.

12. Magnetic apparatus according to claim 3, wherein one dipole magnet is provided per pole extension wheel or roller member pair.

13. Magnetic apparatus according to claim 12, wherein the switchable permanent magnet device is arranged for generating an external magnetic field that can be varied between a maximum flux density output in a fully on or active state and a minimum, practically negligible flux density output in a fully off or deactivated state.

14. Magnetic apparatus according to claim 13, wherein the switchable permanent magnet device includes one of a toggle switch for changing and selecting between fully on and fully off states and an incremental switch for setting and fixing a magnetic flux output between fully on and fully off.

15. Magnetic apparatus according to claim 13, having at least four of the cup-shaped wheel or roller members arranged in pairs, wherein one the switchable permanent magnet device is present per each the wheel or roller member pair, and further including a device for discretely switching the two switchable permanent magnet devices independently or jointly.

16. Magnetic apparatus according to claim 1, wherein the rotatable pole extension bodies are cylindrically cup-shaped and have a diameter and axial dimensions configured to (a) minimize flux transfer losses from the magnetic flux source into the rotatable pole wheels or roller members, (b) provide virtual poles with an area larger than that of the poles on the switchable permanent magnet device thereby to maximize flux transfer outside of a direct physical contact zone between the rotatable pole extension bodies and the counter body, and (c) maintain a predetermined value of magnetic attraction force towards the counter body.

17. Magnetic apparatus according to claim 16, wherein the pole extension wheel or roller members have an annular flange portion having an axial length which is a function of the magnetic field strength of the magnetic flux source.

18. Magnetic apparatus according to claim 17, wherein the cup-shaped pole extension wheel or roller members have an axial length sufficient to cover the magnetic flux source to an extent where the flux source exhibits approximately 70% of its maximum field strength.

19. Magnetic apparatus according to claim 2, wherein one dipole magnet is provided per pole extension wheel or roller member pair.

20. Magnetic apparatus according to claim 19, wherein the switchable permanent magnet device is arranged for generating an external magnetic field that can be varied between a maximum flux density output in a fully on or active state and a minimum, practically negligible flux density output in a fully off or deactivated state.

21. Magnetic apparatus according to claim 20, wherein the switchable permanent magnet device includes one of a toggle switch for changing and selecting between fully on and fully off states and an incremental switch for setting and fixing a magnetic flux output between fully on and fully off.

22. Magnetic apparatus according to claim 20, having at least four of the cup-shaped wheel or roller members arranged in pairs, wherein one the switchable permanent magnet device is present per each the wheel or roller member pair, and further including a device for discretely switching the two switchable permanent magnet devices independently or jointly.

* * * * *